INVENTOR
NICHOLAS R. GUILBERT, JR.

ATTORNEY

INVENTOR
NICHOLAS R. GUILBERT, JR.
BY
ATTORNEY

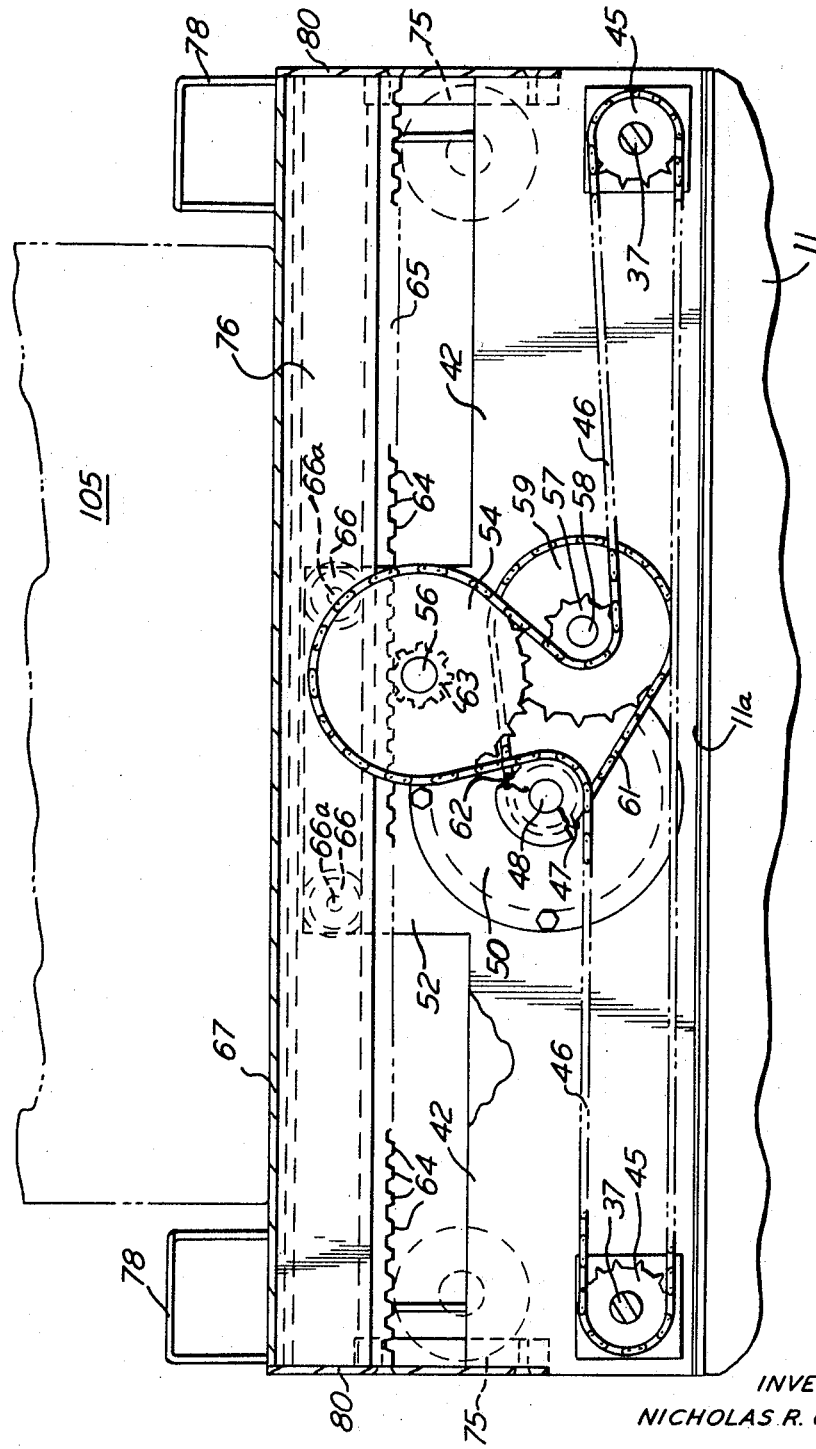

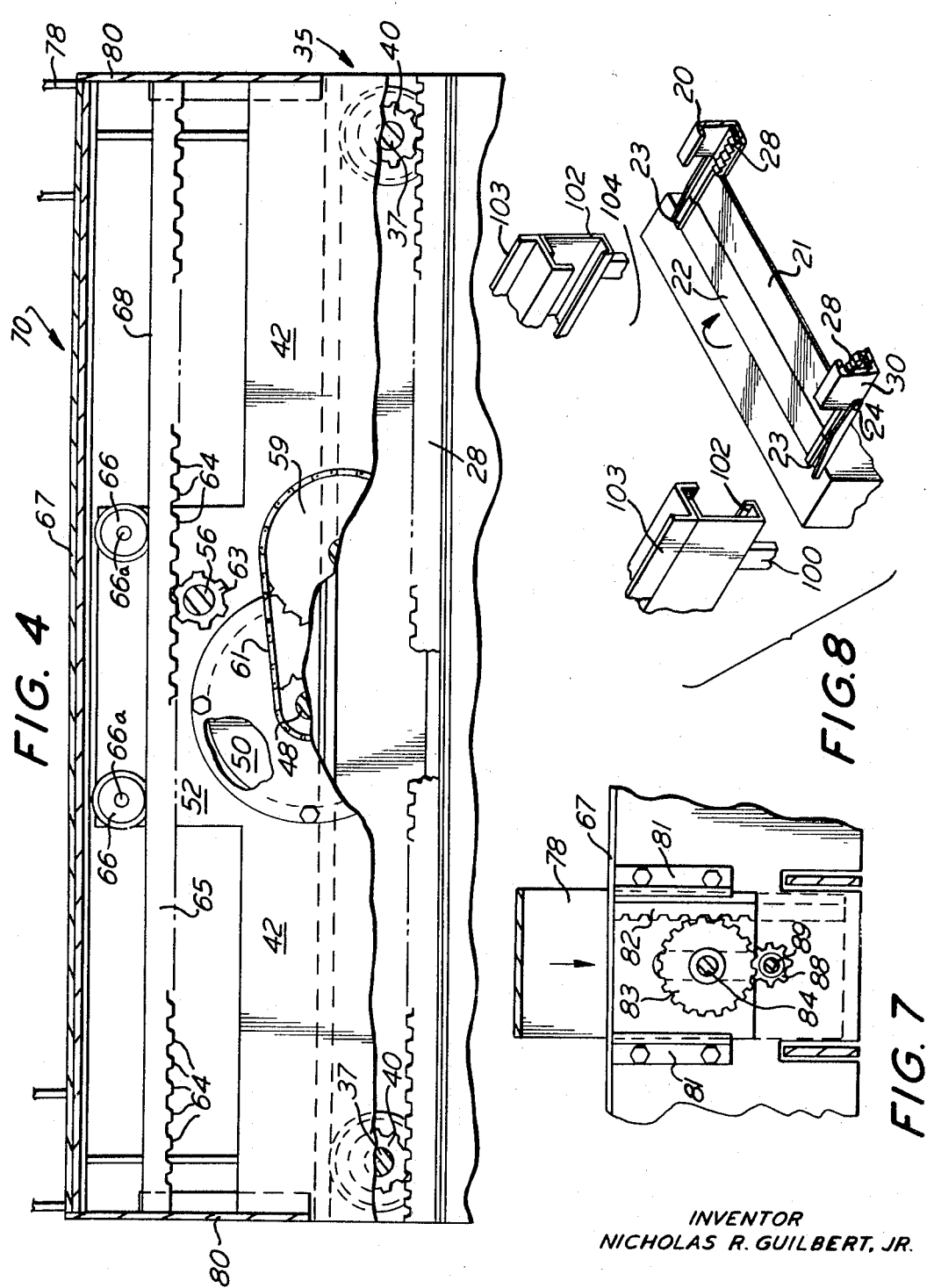

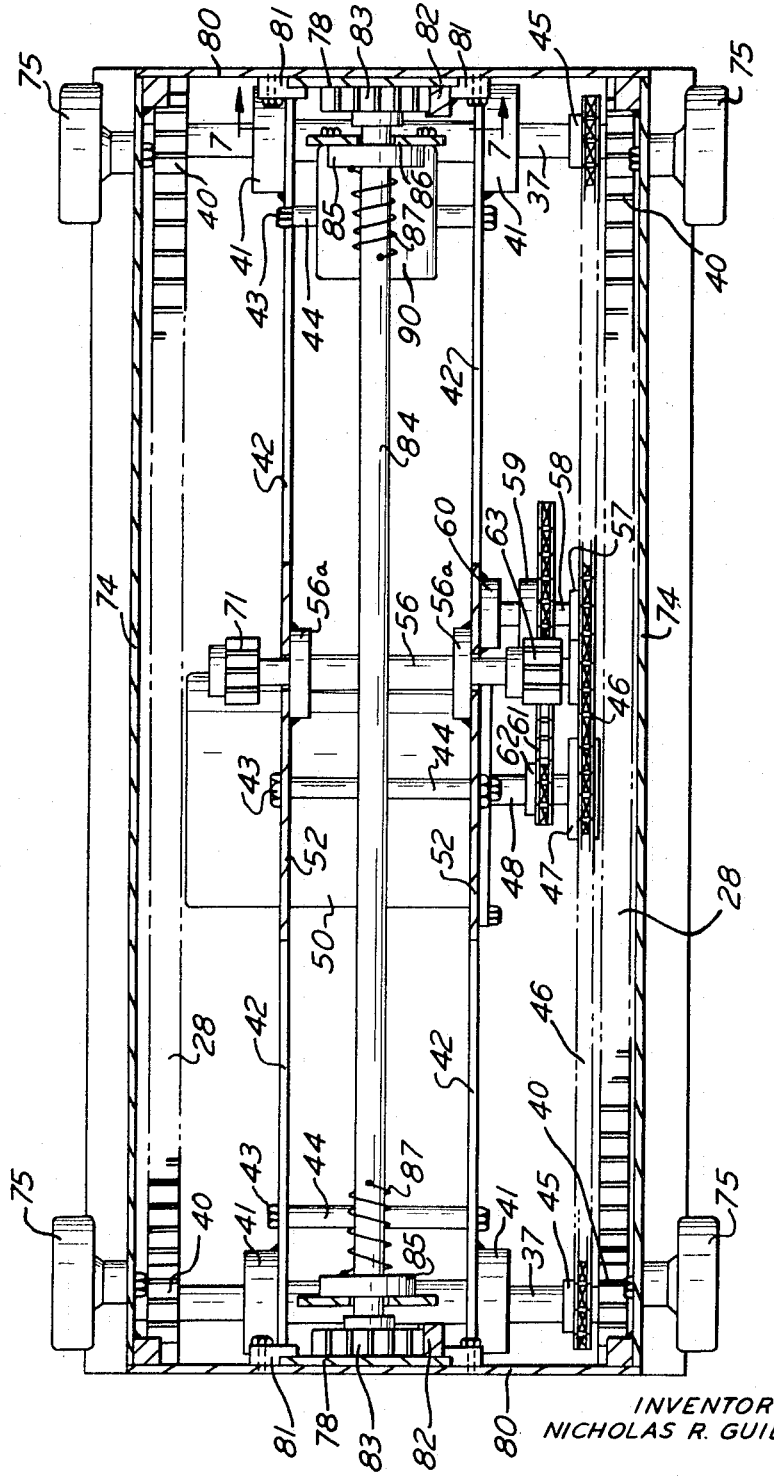

United States Patent Office 3,447,704
Patented June 3, 1969

3,447,704
CONTAINER TYPE AUTOMATIC LOADING AND DISCHARGE SYSTEM FOR DUMBWAITERS
Nicholas R. Guilbert, Jr., Glenside, Pa., assignor to Guilbert, Incorporated, Philadelphia, Pa., a corporation of Pennsylvania
Filed Apr. 10, 1967, Ser. No. 629,439
Int. Cl. B66b 9/10; B65g 17/34; E04h 6/14
U.S. Cl. 214—95                               4 Claims

ABSTRACT OF THE DISCLOSURE

A container type automatic loading and discharge system for dumbwaiter cars and the like wherein the container carriage on the car can be extended under a table top and load or discharge a container from or onto the table top from the car.

BACKGROUND OF THE INVENTION

Field of the invention

This invention relates to container handling by apparatus which is located on a dumbwaiter car and automatically loads containers into the car and discharges containers from the car at desired locations.

Description of the prior art

The present apparatus available for moving trays or containers filled with dishes and other objects into and out of dumbwaiter cars, provides no satisfactory way of loading and unloading the containers from a table to a dumbwaiter and off the dumbwaiter to another location which may be at the other side of the dumbwaiter.

The apparatus of the present invention will remove a container from a table onto a dumbwaiter and then discharge the container onto another table at any desired location adjacent to the dumbwaiter shaftway.

SUMMARY OF THE INVENTION

The principal object of the present invention is to provide an automatic loading and discharge system for dumbwaiters that will automatically remove a container from a table, transport the container into the dumbwaiter car and automatically discharge the container at any desired location including another table.

A further object of the present invention is to provide an automatic container loading and discharge system for dumbwaiters that is rapid and economical in operation and will not harm the containers and the contents of the containers being transported.

A further object of the present invention is to provide an automatic container loading and discharge system for dumbwaiters that can be readily installed on dumbwaiters now in use as well as in new dumbwaiter installations.

A further object of the present invention is to provide an automatic container loading and discharge system for dumbwaiters that will discharge or load containers with respect to the car at either the front or back of the dumbwaiter.

A further object of the present invention is to provide an automatic container loading and discharge system for dumbwaiters that is durable in service and requires a minimum of maintenance.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 3 is a vertical sectional view taken approximately on the line 3—3 of FIG. 2;

FIG. 4 is a vertical sectional view taken approximately on the line 4—4 of FIG. 2;

FIG. 5 is a horizontal sectional view taken approximately on the line 5—5 of FIG. 2;

FIG. 7 is a vertical sectional view taken approximately on the line 7—7 of FIG. 5; and FIG. 8 is a fragmentary perspective view showing a preferred form of drawbridge used with the apparatus of the present invention.

Figure 1:
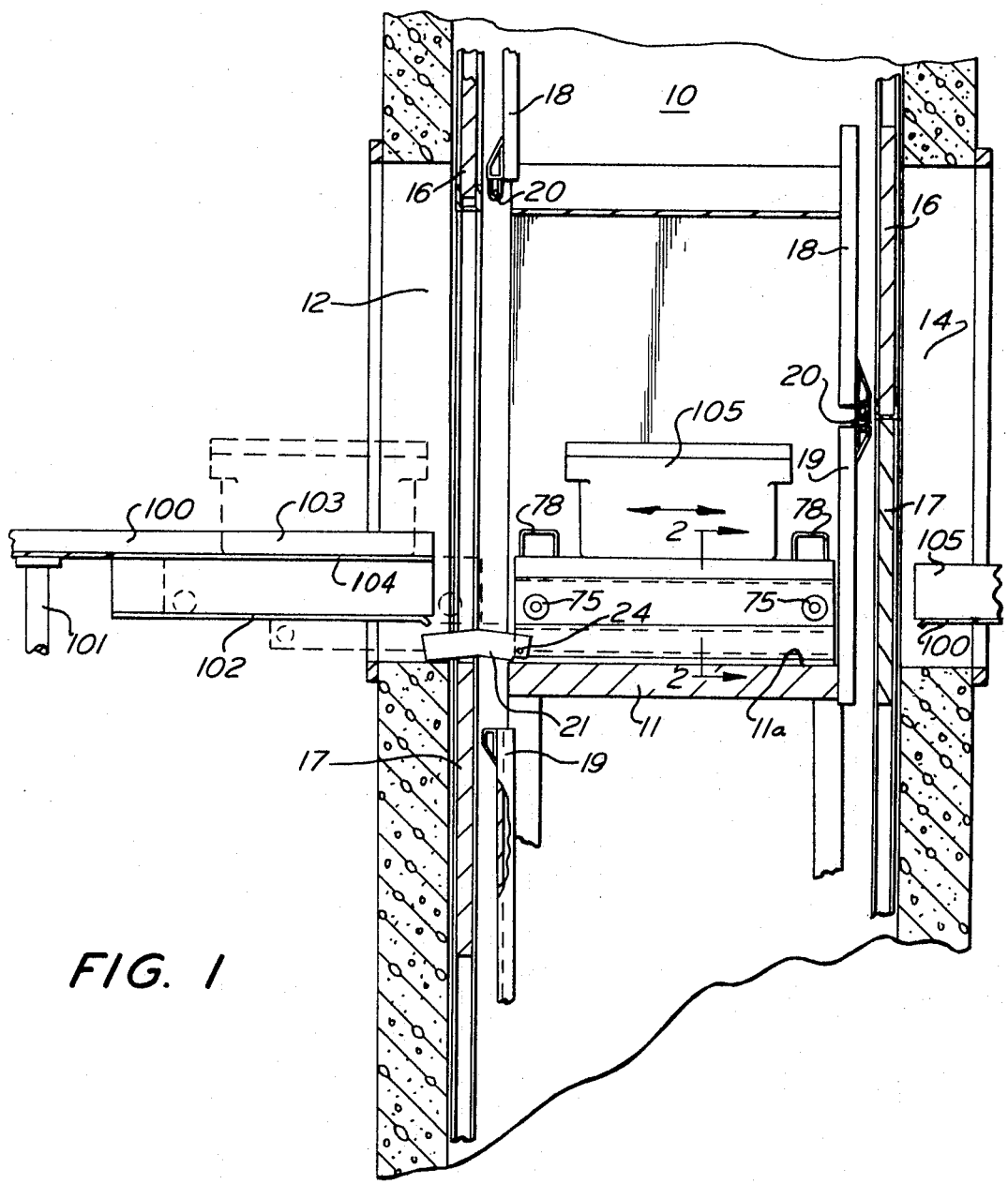
FIGURE 1 is a vertical sectional view of a portion of a dumbwaiter shaft having the apparatus of the present invention on a car in the shaft.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the apparatus of the present invention includes a dumbwaiter shaft 10 and dumbwaiter car 11.

The shaft 10 is provided with access openings 12 and 14 which are normally closed by upper and lower pairs of shaftway doors 16 and 17. The dumbwaiter car 11 is provided with upper and lower pairs of car doors 18 and 19, the upper car doors 18 having a resilient strip or astragel 20 attached thereto. The car 11 may also be provided with drawbridges 21 on either side thereof which can be of any preferred type, such as those shown in my prior application Ser. No. 620,002, filed Mar. 2, 1967, now Patent No. 3,396,822.

The drawbridges 21 each have a central portion 22 and trackways 23 secured to each side thereof, rotatably mounted on the car 11 by pins 24.

Figure 2:
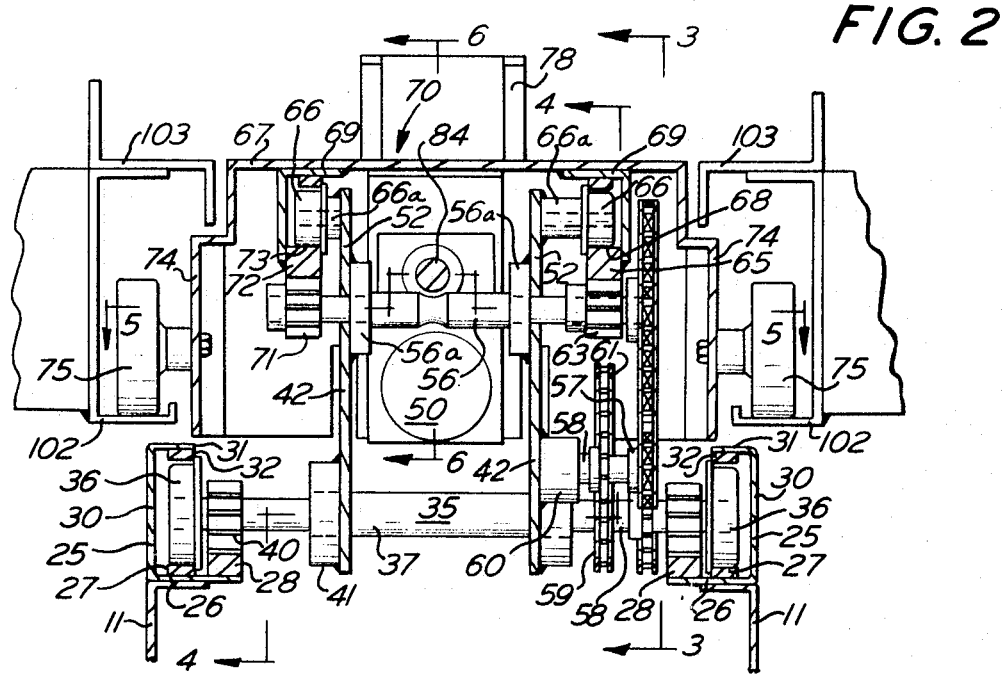
FIG. 2 is a vertical sectional view, enlarged, taken approximately on the line 2—2 of FIG. 1.

The car 11, on its upper surface 11a, has a pair of horizontal lower rails 25 thereon and extending from front to rear of the car. The rails 25 are of substantially U-shape in cross section and include a bottom plate 26 to which a trackway 27 is secured. A gear rack 28 is provided mounted on the bottom plate 26 adjacent and inside of the trackway 27 as illustrated in FIG. 2.

A vertical connecting plate 30 is provided outside of trackway 27 secured to plate 26 and with a horizontal top plate 31 connected thereto and extending inwardly therefrom.

A guide bar 32 is provided secured to the lower side of plate 31 and extending horizontally therealong the length of plate 31.

A lower carriage assembly 35 is provided, with two oppositely mounted pairs of supporting wheels 36 engaging the trackway portions 27 of rails 25, the wheels 36 being rotatably mounted on front and rear shafts 37. The shafts 37 extend horizontally across the carriage assembly 35 and have gears 40 fixedly mounted at their outer ends and engaged with the racks 28 on plates 26.

The shafts 37 are mounted in bearings 41 which are secured to a pair of vertical carriage frame members 42. The frame members 42 extend the length of the carriage assembly 35 and have horizontal cross bolts 43 with spacers 44 thereon engaging the members 42 to hold them apart and in assembled position.

The shafts 37 have sprocket gears 45 fixedly mounted thereon inwardly of gears 40 and at their right hand side as seen in FIG. 5 with a continuous chain 46 engaged therewith and with an idler sprocket 47. The idler sprocket 47 is freely rotatably mounted on shaft 48 of motor 50 which motor is mounted on one of the vertical carriage frame members 42, between the pair of frame members 42 and also mounted on an upper plate 52 which is connected to or formed as an upper extension of one frame member 42. The motor 50 may be of any desired type, including fluid operated but is preferably an electric motor.

The chain 46 is engaged with sprocket gear 54 mounted on shaft 56 which is journaled in bearings 56a secured to plates 52. The chain 46 also engages sprocket gear 57 which is mounted on shaft 58 journaled in bearings 60 also mounted on carriage member 42.

The shaft 58 has another sprocket gear 59 mounted rearwardly of gear 57 as shown in FIG. 3 with which a chain 61 is engaged and connects the gear 57 to a gear 62 keyed to driving shaft 48 for driving the shaft 58.

The shaft 56 is provided with an outer gear 63 which is engaged with gear teeth 64 of rack bar 65.

The plates 52 at the top thereof have pairs of rollers 66 rotatably mounted thereon by shafts 66a and resting on the flat horizontal top surface 68 of the rack bar 65. The rack bar 65 extends the length of carriage assembly 35 and is mounted by L shaped angles 69 to the top plate 67 of an upper carriage assembly 70.

The shaft 56 extends across the members 42 to the left as seen in FIG. 2 and is provided with an additional gear 71 on the opposite end from gear 63, which gear 71 is engaged with a rack bar 72 identical to rack bar 65 and also mounted to carriage assembly 70. Pairs of rollers 66 are provided rotatably mounted on the left member 42 and engaged with the top surface 73 of bar 72.

The upper carriage assembly 70 is substantially the same length as the lower carriage assembly 35 and has a pair of vertical downwardly extending frame members 74 attached to either side of plate 67 with pairs of wheels 75 rotatably mounted thereon at the bottom of frame members 74 and extending outwardly therefrom. Limit switches (not shown) may be provided for controlling the carriage movement.

The top plate 67 has a rectangular longitudinal slot 76 in the center thereof and small crosswise slots 77 near either end of approximately the width of slot 76.

Figure 6:
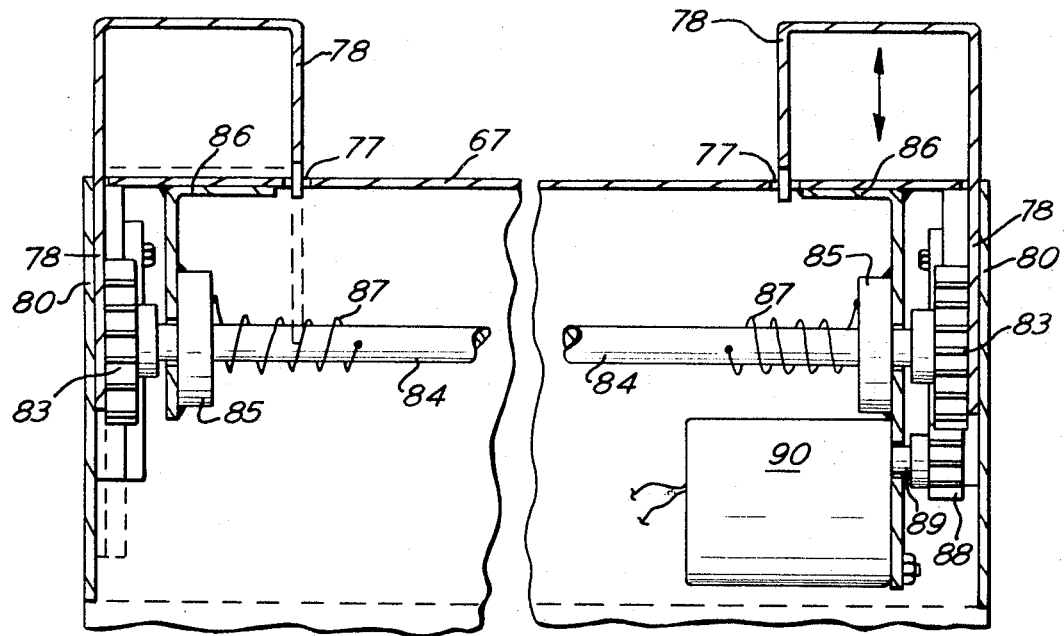
FIG. 6 is a vertical sectional view of the carriage taken at the location indicated by the line 6—6 of FIG. 2.

Pushers 78 are provided at each end of plate 67 vertically slidably mounted on end closure plates 80 which are fastened to the carriage members 74 and the top plate 67 in any desired manner. The pushers 78 are of substantially U shape in cross section as seen in FIG. 6, have vertical portions which move into slots 77 and are retained by trackways 81 mounted on the end plates 80. The pushers 78 have vertical gear racks 82 fastened thereon engaged by gears 83 on shaft 84 enabling the pushers 78 to be moved upwardly or downwardly as desired. The shaft 84 is journaled in bearings 85 which are mounted on L-shaped brackets 86 fastened to the underside of plate 67 with springs 87 connected to the shafts 84 and housings of bearings 85. The springs 87 tend to urge the pushers 78 to full upward position when not otherwise driven. The gear 83 at the right hand end as shown in FIG. 6 is engaged by a driving gear 88 mounted on shaft 89 of a pusher positioning motor 90 of any desired type including fluid operated and electric, which is also mounted on bracket 86.

A table 100 for reception of a container 105 outside the shaftway 10 is illustrated in FIGS. 1 and 2 and may include a leg 101 with lower rails 102 and horizontally spaced top rails 103 with an access space 104 therebetween. The lower rails 102, as seen in FIG. 2, provide trackways for supporting and guiding the wheels 75 of the upper carriage assembly 70 when in extended position. The top rails 103 provide a surface to support the container. A table 100 is provided at each location outside the shaftway where loading and unloading is to be effected.

A typical container 105 for use by this system is illustrated in FIG. 1 but any other suitable container which bridges and is slidably supported by the rails 103 may be used as desired.

The mode of operation will now be pointed out.

Assume that a container 105 has been placed on table 100 and is to be loaded onto the dumbwaiter and delivered to another location.

The dumbwaiter car 11 is brought to the landing where the table 100 is located by mechanism (not shown) well known in the art. The shaftway doors 16 and 17 are opened by mechanism (not shown) and the car doors 18 and 19 are opened by mechanism (not shown) also well known in the art.

The motor 90 is activated in a direction to cause shaft 89 to turn gears 83 through shaft 84 to retract pushers 78 to a lowered position. The drawbridge 21 is lowered on the side where the table 100 has a container 105 to be moved. The drawbridges 21 bridge the gap between the dumbwaiter car 11 and the sill of the access doorway 12.

The motor 50 is activated so that lower carriage assembly 35 is moved toward the table 100, such movement being effected through shaft 48, sprocket 62, chain 61, sprocket 59 and shaft 58 to drive the chain 46.

The wheels 36 are initially resting on trackway 27 and as the lower carriage assembly 35 moves outwardly the wheels 36 engage the trackways 23 of the drawbridge 21. This engagement of wheels 36 with trackways 23 transfers the load from the rails 25 on the car floor 11a to drawbridge 21 and compensates for any difference in level between the car 11 and the landings so that the carriage will match up with the table 100.

The chain 46 engages gear 54 which is mounted on shaft 56 which is turned by chain 46, and through gear 63 on shaft 56 meshed with gear teeth 64 urges upper carriage assembly 70 in the space 104 between rails 102 and 103 and in a direction determined by the direction of rotation of the motor 50.

The wheels 75 engage the lower rails 102 and guide the carriage 70 under the container 105. The mechanism is stopped with the upper carriage assembly 70 under the rails 103 and container 105.

The motor 90 is activated to advance the pushers 78 to full upward position through shaft 89, gears 83 and shaft 84. The motor 50 is again activated to cause the upper and lower carriage assemblies 35 and 70 to return to the dumbwaiter car 11 by mechanism as above described.

The car 11 may then be moved to any desired location and the container 105 moved outwardly on either side to another table 100 by a reversal of the action just described for loading the car 11.

It will thus be seen that apparatus has been provided with which the objects of the invention are attained.

I claim:

1. Transfer apparatus for moving receptacles onto and from a car which is vertically movable in a shaftway to a predetermined loading and unloading location comprising:

a table outside said shaftway at each loading and unloading location having horizontal supports for a receptacle with a space therebetween, a carriage on the car having spaced horizontal supports for a receptacle, said table having lower horizontal track members spaced below its horizontal receptacle supports, said carriage having a lower horizontally movable portion extendable beyond the car and into said space between said receptacle supports of said table, a drawbridge member extendable out of the shaftway and having a trackway for supporting said lower carriage portion, said carriage having an upper portion horizontally movable outwardly beyond said lower movable portion,
said upper carriage portion being provided with pairs of wheels adapted to engage said track members on said table in extended position,
operating mechanism on the car for said carriage portions including a first driving motor,
said upper carriage portions having a pusher vertically movable in the space between said supports, and
mechanism for selectively positioning said pusher in an elevated operating position for engagement with a receptacle to be moved,
said last mechanism including a second driving motor.

2. Transfer apparatus as defined in claim 1 in which: mechanism is provided between said carriage portions for advancing and retracting said upper carriage assembly at a faster speed than said lower carriage assembly.

3. Transfer apparatus as defined in claim 1 in which: said pusher positioning mechanism includes a rack carried by said pusher,
a gear engaging said rack, and
driving members between said second driving motor and said gear.

4. Transfer apparatus as defined in claim 3 in which: a resilient means is provided urging said gear in a predetermined direction.

References Cited

UNITED STATES PATENTS

| | | |
|---|---|---|
| 1,998,290 | 4/1935 | Schroeder. |
| 2,065,107 | 12/1936 | Turner et al. |
| 2,073,721 | 3/1937 | Wheelock. |
| 2,428,856 | 10/1947 | Sinclair. |
| 2,752,051 | 6/1956 | Stoahm et al. |
| 3,150,787 | 9/1964 | Patignan _____ 214—514 |

GERALD M. FORLENZA, *Primary Examiner.*

RAYMOND B. JOHNSON, *Assistant Examiner.*

U.S. Cl. X.R.

187—3; 214—16.4, 730